US012252027B2

(12) United States Patent
Brooks et al.

(10) Patent No.: US 12,252,027 B2
(45) Date of Patent: Mar. 18, 2025

(54) VEHICLE DOCKING STRUCTURE WITH A SOLAR PANEL

(71) Applicant: Lyft, Inc., San Francisco, CA (US)

(72) Inventors: Jordan Elias Brooks, San Francisco, CA (US); Alexander Timothy Dixon, San Anselmo, CA (US); Robert Andrew Ewaschuk, Brooklyn, NY (US); Chen-Yu Lin, Santa Clara, CA (US); Dawei Liu, San Bruno, CA (US); Scott McDaid, San Francisco, CA (US); Ulhas Subramaniam, Fremont, CA (US); Joseph Daniel Taylor, San Francisco, CA (US); Jennifer Uang, Emeryville, CA (US)

(73) Assignee: Lyft, Inc., San Francisco, CA (US)

( * ) Notice: Subject to any disclaimer, the term of this patent is extended or adjusted under 35 U.S.C. 154(b) by 237 days.

(21) Appl. No.: 17/565,269

(22) Filed: Dec. 29, 2021

(65) Prior Publication Data

US 2023/0202326 A1    Jun. 29, 2023

(51) Int. Cl.
*B60L 53/51*  (2019.01)
*B60L 53/65*  (2019.01)
*B60L 53/68*  (2019.01)

(52) U.S. Cl.
CPC .............. *B60L 53/51* (2019.02); *B60L 53/65* (2019.02); *B60L 53/68* (2019.02); *B60L 2200/12* (2013.01)

(58) Field of Classification Search
CPC .......... B60L 53/31; B60L 53/51; B60L 53/65; B60L 53/68; B60L 53/305;
(Continued)

(56) References Cited

U.S. PATENT DOCUMENTS

| 2009/0301976 A1* | 12/2009 | Ayotte | B62H 3/00 |
| | | | 211/5 |
| 2012/0143401 A1* | 6/2012 | Jayadevappa | E05B 47/0012 |
| | | | 701/2 |

(Continued)

FOREIGN PATENT DOCUMENTS

| KR | 20150056729 A | 5/2015 |
| KR | 20160054099 A | 5/2016 |
| WO | WO 2017020134 A1 | 2/2017 |

OTHER PUBLICATIONS

International search report and Written Opinion received for PCT Application No. PCT/US2022/053324, 8 pages, Apr. 27, 2023.

*Primary Examiner* — Richard Isla
*Assistant Examiner* — Johali A Torres Ruiz
(74) *Attorney, Agent, or Firm* — Baker Botts L.L.P.

(57) ABSTRACT

In one embodiment, an apparatus for docking vehicles includes a housing structure comprising two side portions and a top portion connecting the two side portions, the two side portions and the top portion forming a cavity for receiving a portion of a vehicle, an electrically-powered locking assembly, carried by the housing structure, for securing the housing structure to the vehicle in response to the portion of the vehicle being received by the cavity of the housing structure, an electrically-powered communication device, coupled to the housing structure, for enabling data communication over a network, and a solar panel, carried by an external surface of one of the side portions of the housing structure, for independently converting light received by the solar panel into electrical energy.

22 Claims, 16 Drawing Sheets

(58) Field of Classification Search
CPC .. B60L 2200/12; B60L 2270/36; B60L 50/20; Y02T 10/70; Y02T 10/7072
See application file for complete search history.

(56) References Cited

U.S. PATENT DOCUMENTS

| | | | | |
|---|---|---|---|---|
| 2015/0096335 | A1* | 4/2015 | Haidak | B62H 3/02 |
| | | | | 70/57.1 |
| 2016/0311334 | A1* | 10/2016 | Moravick | B60L 58/12 |
| 2019/0127002 | A1* | 5/2019 | Bettez | B62H 3/04 |
| 2020/0031247 | A1* | 1/2020 | Moravick | B60L 50/20 |
| 2021/0094639 | A1* | 4/2021 | Greenblatt | B62H 5/003 |
| 2021/0107579 | A1* | 4/2021 | Adam | B60L 50/20 |
| 2021/0138921 | A1 | 5/2021 | Fox | |
| 2022/0169401 | A1* | 6/2022 | Di Cosola | B60L 53/12 |
| 2022/0321052 | A1* | 10/2022 | Sassi | H02S 30/20 |

\* cited by examiner

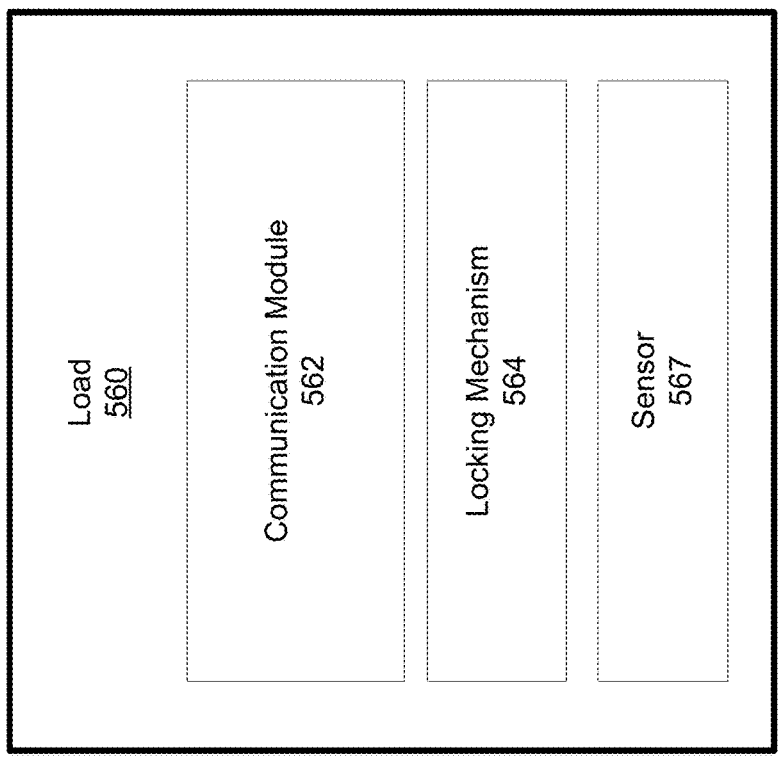
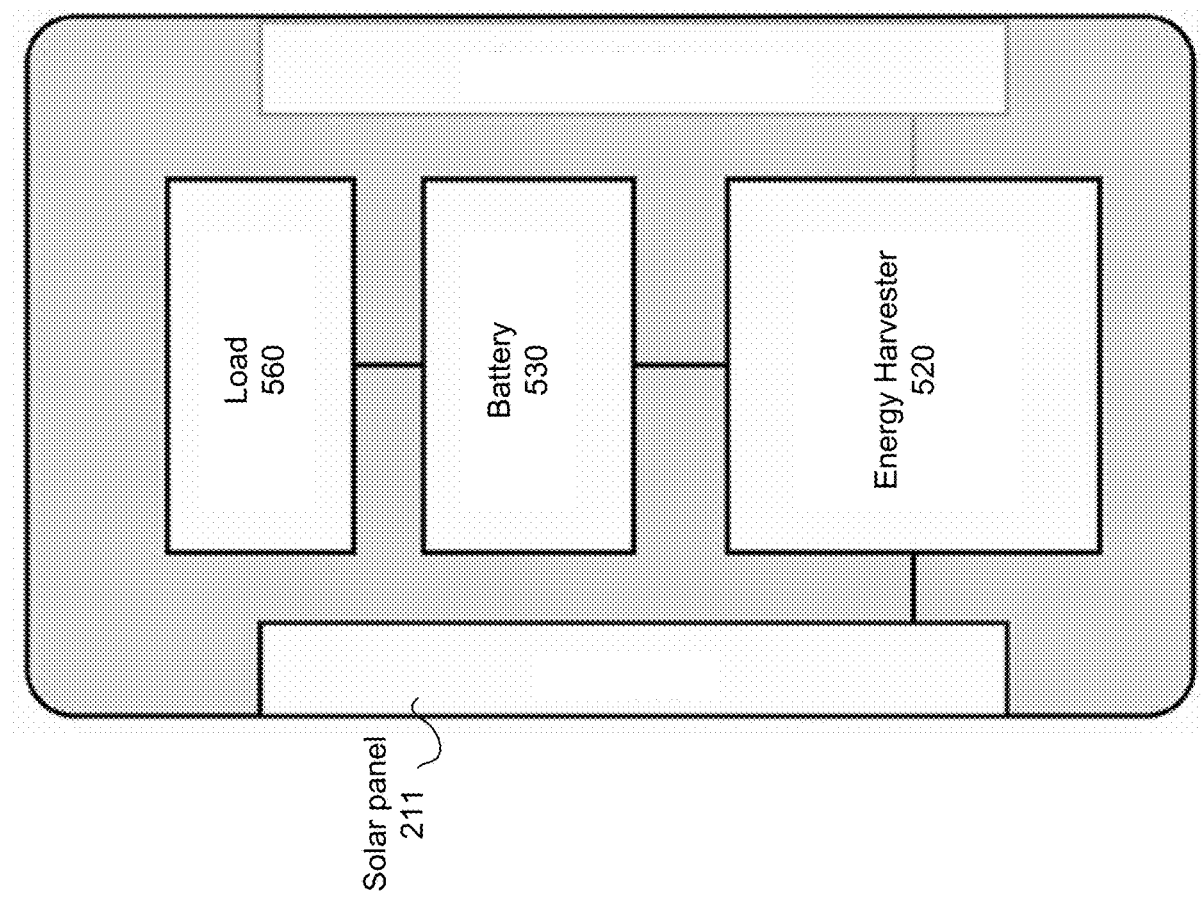
FIG. 5

VEHICLE DOCKING STRUCTURE WITH A SOLAR PANEL

BACKGROUND

Traditional configurations for docking stations rely on a centralized power source (e.g., electrical grid, battery) and a kiosk that utilizes a centralized communication module to support its docking mechanism. There is a reliability concern with such centralized configurations since they have a single point of failure that could render unavailable every rideable/vehicle docked at the station (e.g., bikes, scooters, and etc.). Moreover, due to relying upon the centralized power source, the initial costs involved with the centralized configuration make it only feasible to deploy docking stations at heavily populated areas and less feasible at less populated areas where only a few docks may be required. Furthermore, docking stations connected to the electrical grid require higher deployment costs and are less flexible on where they can be deployed (e.g., only where the electrical grid is available), and docking stations supported by a battery require additional labor costs, for example, due to the necessary battery swaps every so often (e.g., on a monthly basis). Accordingly, there is a need for a new dock or a docking station that is more reliable and flexible in terms of where it can be deployed.

BRIEF DESCRIPTION OF THE DRAWINGS

FIG. 5 illustrates an example of electrical components of a dock, according to some embodiments.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
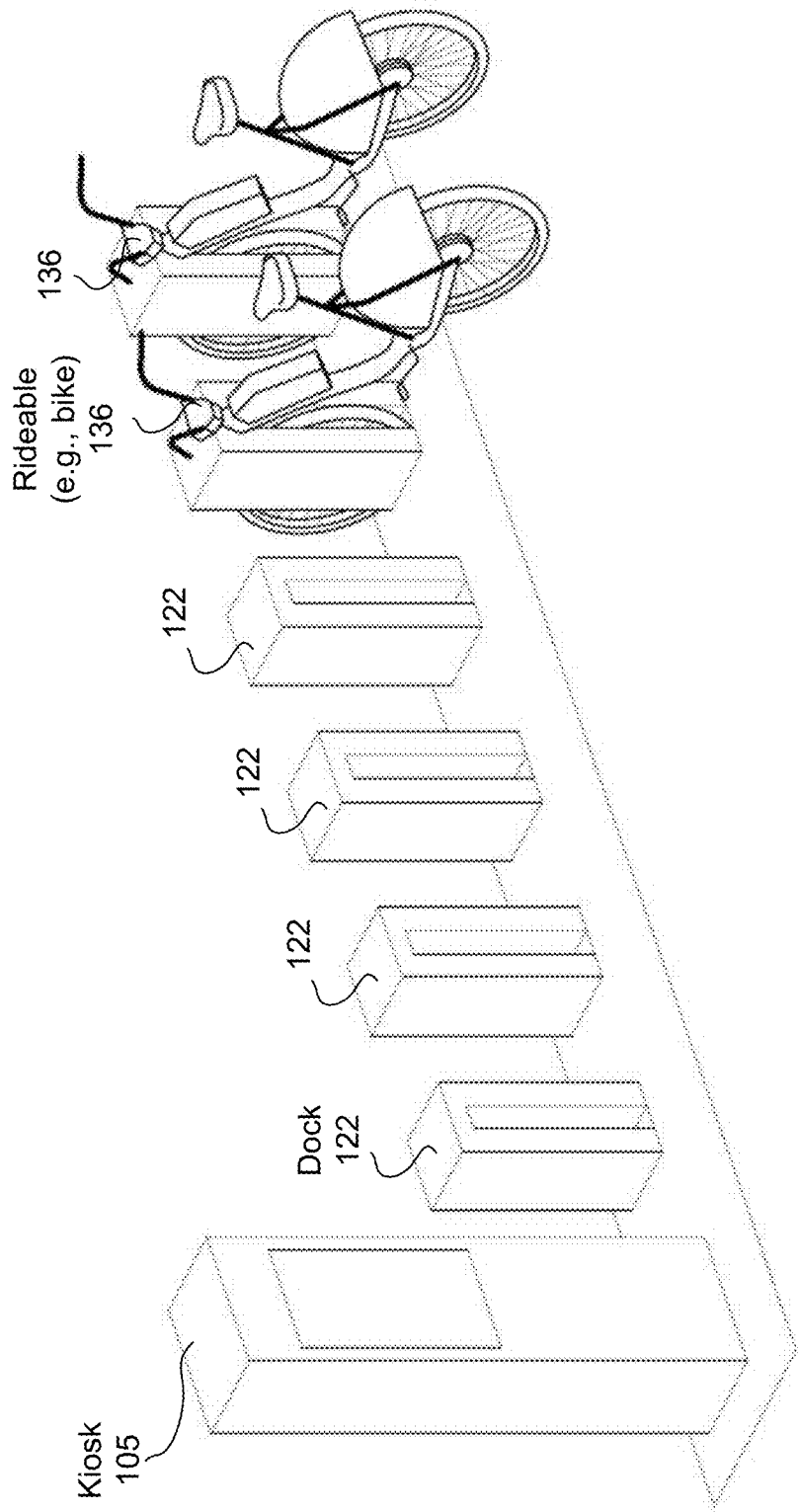
FIG. 1 illustrates an example docking station with a kiosk.

The architecture of a self-sufficient dock disclosed herein provides a technical solution to the issues involved with docking stations relying on a centralized power source (e.g., electrical grid, battery) and a centralized communication module. Embodiments described herein disclose a self-sufficient, independently-operated dock with improved reliability, low operation costs, and flexibility to be deployed in both high- or low-density areas, all without requiring a kiosk, a centralized power source, or underground power and communication infrastructure. As used herein, the term "self-sufficient" may refer to a dock capable of independently generating sufficient power to power its various docking functionalities without requiring or using power generated by other docks or a power source external to the dock. In some embodiments, the various docking functionalities include locking the rideable at the dock, unlocking the rideable from the dock, communicating with a transportation management system (e.g., to indicate the status of a dock with respect to whether a rideable is docked to the dock and whether a rideable is locked or unlocked to the dock), and for locking out the dock to reserve the dock for a rideable, but the docking functionalities may not include charging a rideable. In some embodiments, the various docking functionalities may also include charging the rideable. Indeed, the docking functionalities performed by the dock require a significant amount of power. A dock may include a "housing structure" that may take the form of a bollard. Each dock is configured with one or more solar panels, battery, charging system, locking mechanism, and communication system, allowing it to be self-sufficient and independently deployable (even in low-density areas). The solar panels may be configured to draw power from ambient or diffuse light and do not require direct sunlight to supply the necessary power to operate the various docking functionalities. The solar panels may be also oriented vertically relative to the ground or the platform of the dock to allow the space above the dock to be freed and occupied by portions of a bike, such as its basket. In some examples, the solar panels may be diagonally oriented (i.e., any angle range greater than 0 degrees to less than 90 degrees between the light-absorbing surface of the solar panel relative to the surface of the ground or the dock platform). Given that the solar panels do not require direct sunlight, the docks can be positioned close to each other or close to other non-docking structures that could potentially block direct sunlight, as may be often present in high-density areas. The vertical orientation or diagonal orientation is also beneficial since it provides natural resistance to dust buildup over the solar panels, or in high latitude markets, snow buildup. Each dock may also be configured to be connected to an external power source to provide the capability to charge electrical vehicles (e.g., bikes, scooters, etc.) although it should be noted in some examples the self-sufficient docking stations described herein may generate sufficient power to charge electrical vehicles FIG. 1 illustrates an example of a traditional docking station 100 with a kiosk 105. Traditional docking stations may comprise a kiosk and multiple docks, each dock 122 comprising a docking mechanism for securing a rideable 136. A rideable 136 is a transportation vehicle that a user could ride on to travel from point A to point B. Examples of a rideable include a bike, scooter, or other forms of a rideable vehicle. Traditional docking stations rely on a centralized power source (e.g., electrical grid, battery) to support its docking mechanism and a kiosk. A kiosk 105 is an interactive terminal that provides users with access to, and information about, rideables 136 that are docked at a station. Traditional docking stations 100 are centralized in that the kiosk 105 and docks 122 are powered by a single power source (e.g., electrical grid or a battery). The centralized configuration has a single point of failure that, if failed, could render unavailable every rideable docked at the station, for example, when the electrical grid is down, if a station battery depletes, or the communication module of a kiosk malfunctions. Moreover, the deployment and maintenance costs involved with the centralized configuration make it only feasible to deploy such docking stations at heavily populated areas and unfeasible at less populated areas where only a few docks may be required due to low use of rideables. For example, it may not be economically efficient to deploy only a single dock in a traditional docking station with a kiosk due to the cost of installing or maintaining the kiosk. Indeed, it may not be economically efficient to deploy a single dock because installing a traditional dock 122 on a street requires city permits to dig underground to install long, underground telecommunication lines and electrical power cables connecting to an electrical grid in order to support the communication and power needs of the traditional dock 122. In some instances, the traditional dock 122 cannot be deployed in areas where there are underground restrictions (e.g., sewage lines). In other words, the deployment of the traditional dock 122 may be limited by underground restrictions. Furthermore, docking stations that are connected to the electrical grid require additional components and labor for interfacing with the grid and thus are less flexible on where they can be deployed (e.g., only where the electrical grid is available). Docking stations supported by a station battery also require additional labor, for example, for swapping out the station battery every so often (e.g., on a monthly basis). Embodiments disclosed herein provides a new type of a dock that could operate independently from a kiosk and does not rely on an external power source such as an electrical grid to operate its various docking functionalities.

Figure 2:
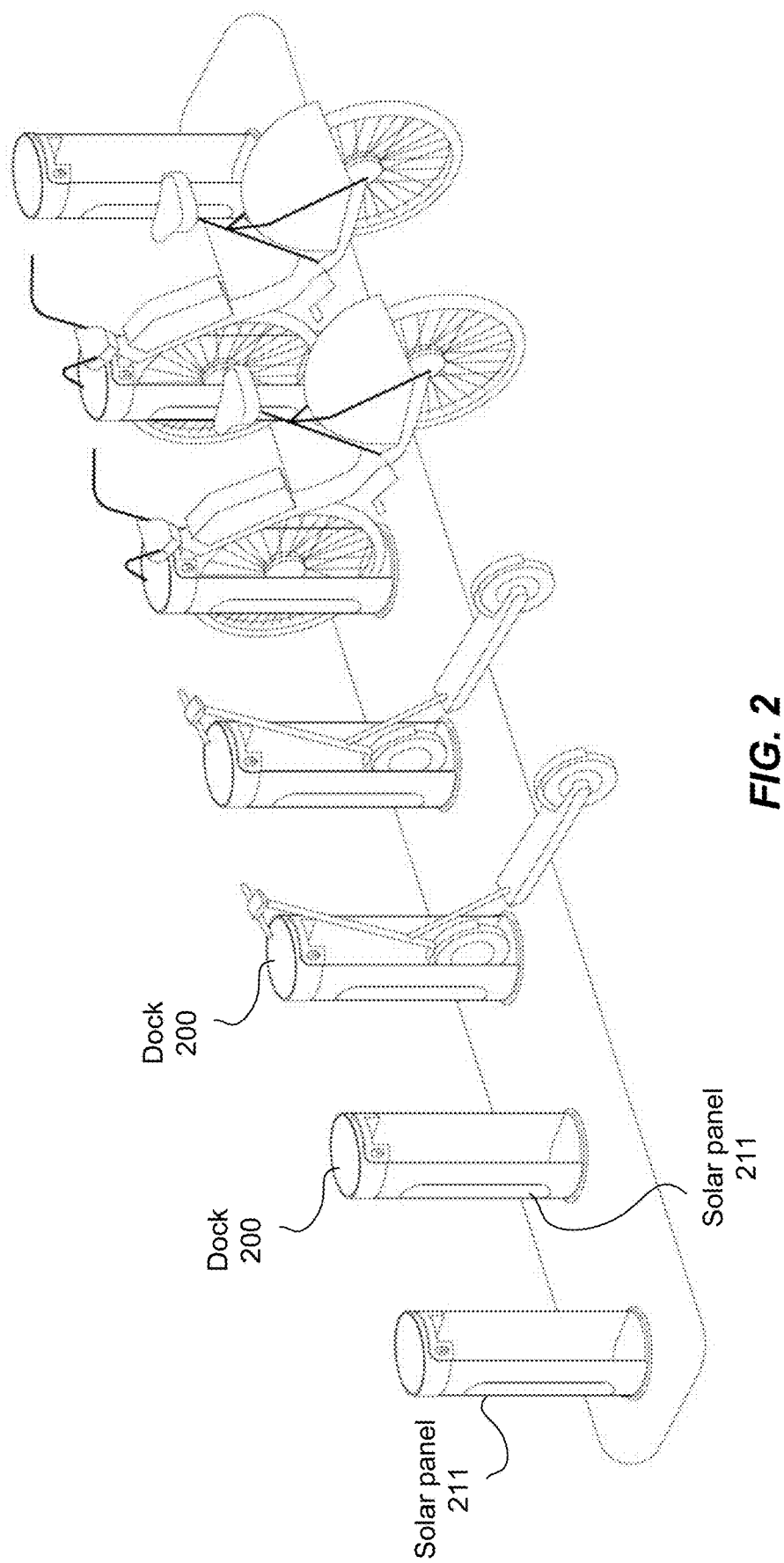
FIG. 2 illustrates example docks configured with a solar panel, according to some embodiments.

FIG. 2 illustrates examples of self-sufficiently powered, independently-operated docks 200 with improved reliability, low operation costs, and flexibility to be deployed in both high- or low-dense areas. In contrast to a traditional dock 122, a dock 200 may be configured with a solar panel 211 that is capable of drawing sufficient power from diffused, ambient, albedo, or reflected irradiance/light (rather than direct sunlight) to operate the electrically-powered components within the dock 200. As illustrated in FIG. 2, the solar panel 211 may be oriented vertically relative to the ground such that the solar panel 211 may not be positioned to receive direct sunlight during daytime. Additionally, orienting the solar panel 211 in a vertical orientation may minimize the footprint of each dock 200; thereby, maximizing the number of docks 200 that may be installed in an area with an overall small footprint. For example, in an urban downtown area such as a corner of a busy intersection in front of a storefront, it is economically efficient to deploy even a handful of docks 200 at the corner because each of the docks 200 is self-sufficient and its primary power systems and communication systems are included within its housing structure and above ground. In contrast, a traditional dock 122 may require city permits to dig underground to install underground telecommunication lines and electrical power cables connecting to an electrical grid that are necessary to power and communicate with the traditional dock 122.

Figure 3:
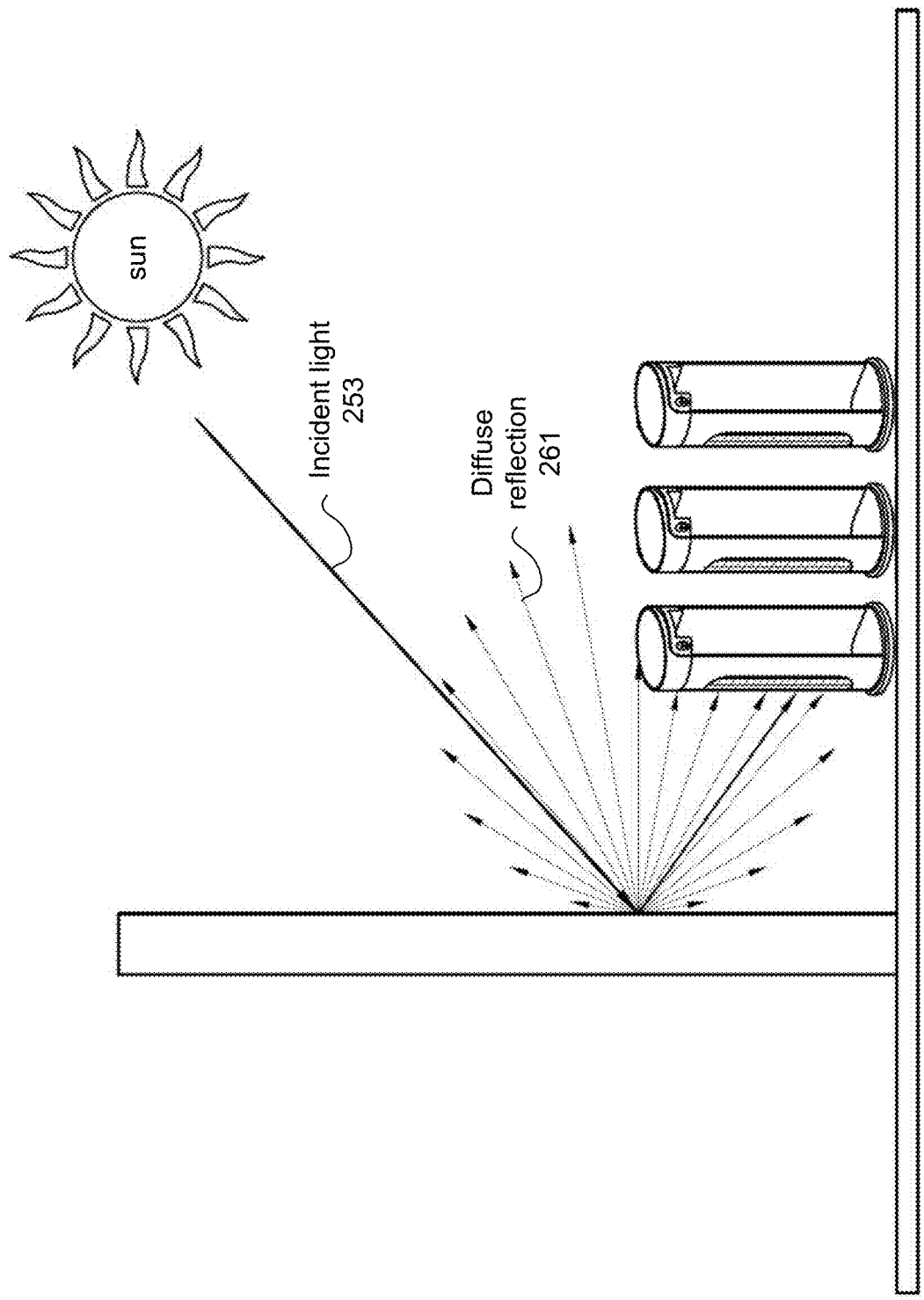
FIG. 3 illustrates another example of docks configured with a solar panel, according to some embodiments.

FIG. 3 illustrates an example of a dock 200 that is receiving diffused reflection 261 of an incident light 253 (e.g., sunlight, ambient light, etc.), which diffused reflection 261 has been reflected off of an object in an external environment (e.g., a structure). The self-sufficient docks 200 that are disclosed herein are able to draw sufficient power from such indirect light to power its internal docking components (e.g., locking mechanism, wireless communications, etc.). The self-sufficient docks 200 that are disclosed herein are able to operate based on indirect light (e.g., diffused, ambient, albedo, or reflected irradiance/light), and thus are much more flexible on where they can be deployed (e.g., even where direct sunlight is not available). The self-sufficient docks 200 are also flexible in how they can be deployed, for example, closely next to each other (e.g., distance of 1 foot apart), as shown in FIG. 3. Such a configuration addresses a deficiency in a dock configuration that requires direct sunlight to power docking components since docks that are too close to each other may block light from reaching each others' solar panels. Although docks that are exposed to direct sunlight may receive a superficial amount of indirect sunlight, the solar panels and related power systems of these docks are incapable of absorbing and converting a sufficient amount of indirect light during the daytime in order to provide necessary docking functions throughout the evening and/or during an extended period where there is a lack of sunlight. Another benefit to having vertically orientated solar panels is that the vertically orientated solar panels will not be covered by a portion of a bike 136, for example, a basket that is mounted in front of the bike.

Figure 4A:
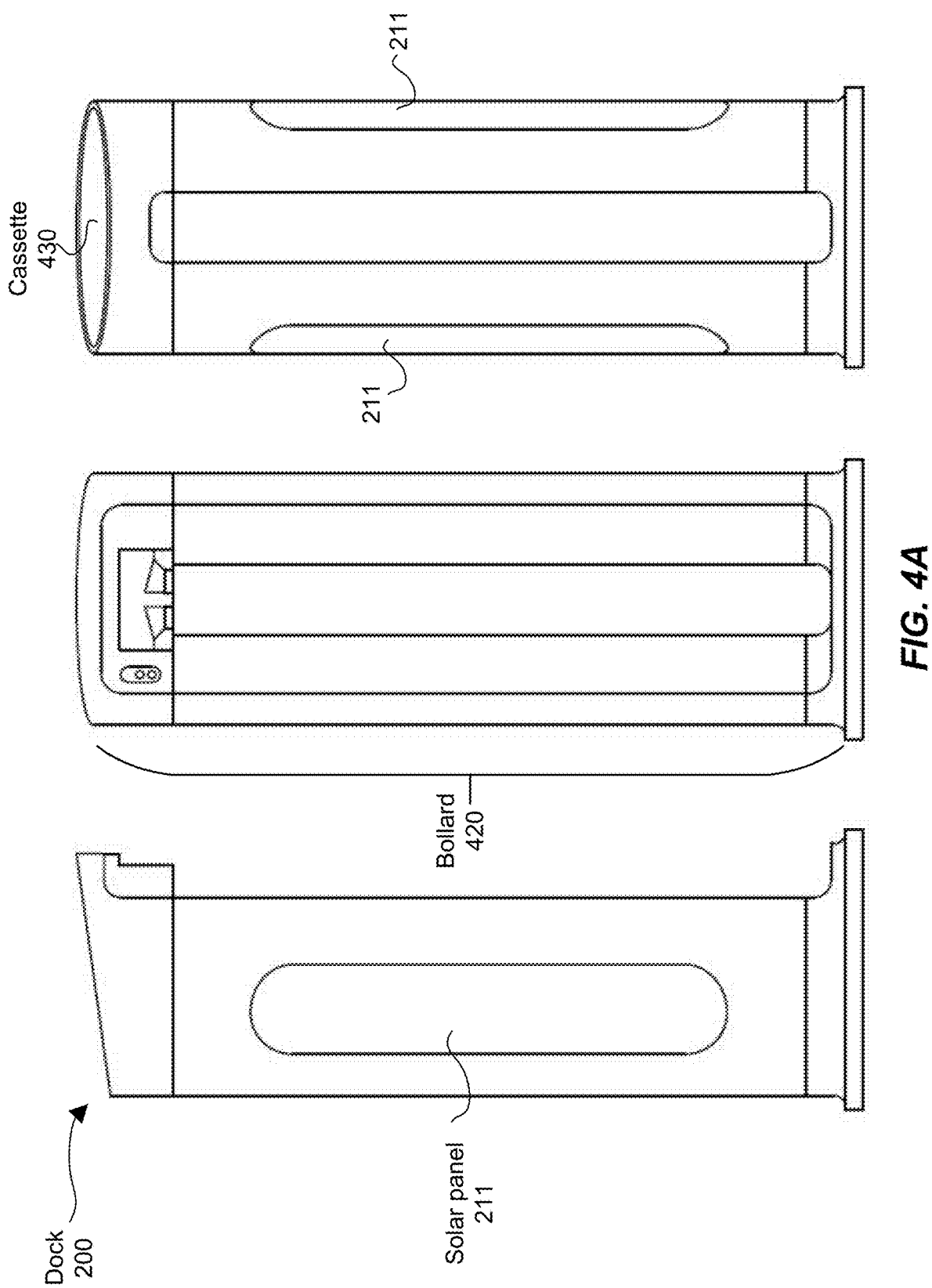
FIGS. 4A-4F illustrate an example dock and its components, according to some embodiments.

FIGS. 4A-4G illustrate an example dock 200 with vertically oriented solar panels 211. In particular embodiments, as illustrated in FIG. 4A, a dock 200 is comprised of a bollard structure 420, a vertically oriented solar panel 211, a cassette assembly 430 comprising battery, communication module, and locking assembly. In some embodiments, the cassette assembly 430 may include a user interface panel for the rider to execute functions at the dock 200. In particular embodiments, a dock 200 may be configured with a single solar panel 211, or two solar panels 211 (e.g., one on each side of the bollard structure).

Figure 4B:
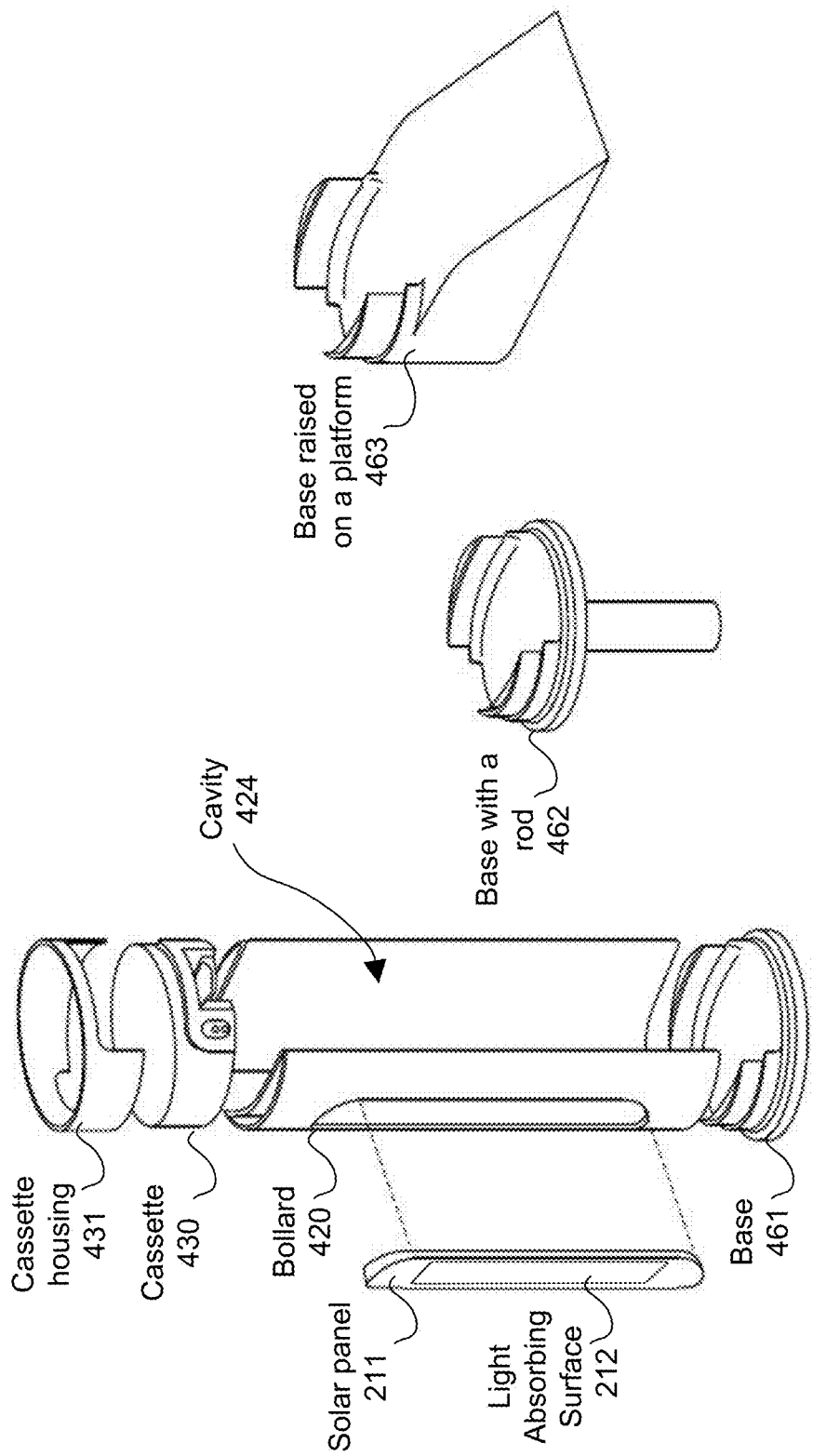

FIG. 4B illustrates an exploded view of an example dock 200. In particular embodiments, a dock 200 may be comprised of a bollard structure 420 with a cavity 424 for receiving a rideable, a cassette assembly 430, a housing 431 for the cassette assembly, a solar panel 211, and a base 461. In particular embodiments, a base 462 may be configured as a rod that extends downwards into the ground. In particular embodiments, a base 463 could be installed on a raised platform. In particular embodiments, a solar panel 211 may comprise a light-absorbing surface 212 that includes photovoltaic cells, which are electrical devices that convert light energy into electricity by the photovoltaic effect.

Figure 4C:
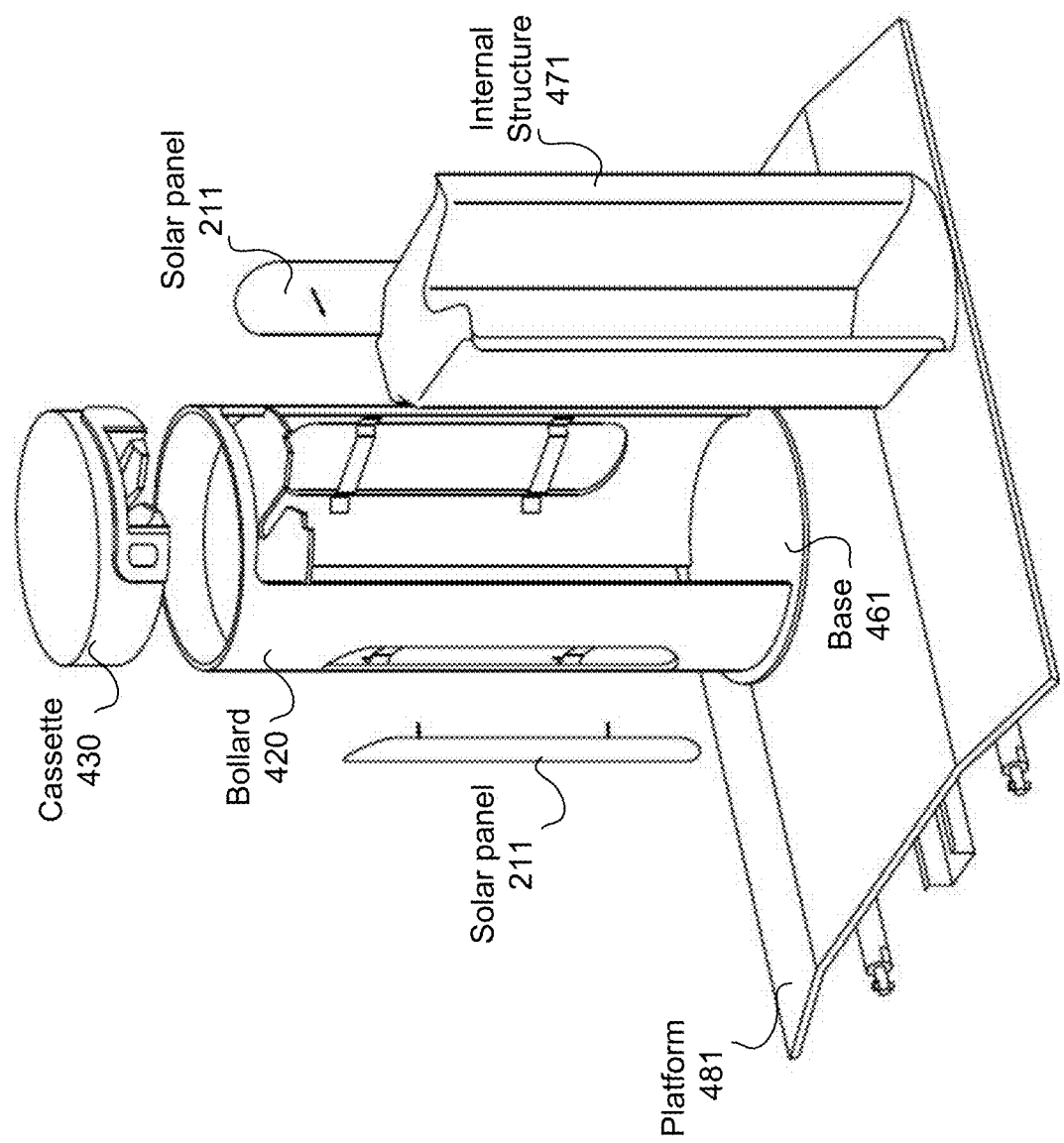

FIG. 4C illustrates another exploded view of an example dock 200. In particular embodiments, a dock 200 may comprise an inner component/structure 471 having walls that define a cavity for receiving and securing a rideable therein. In particular embodiments, the base 461 of the dock 200 may be configured on top of a platform 481, under which runs electrical wiring that may be connected to the dock 200. As shown in FIG. 4C, a solar panel 211 may be configured on one side, or both sides of the bollard structure 420. If a solar panel is not configured on a side of the bollard structure 420, a cover panel may be configured in its place instead. The base 461 may provide a supportive structure for supporting the dock 200 above ground. In some examples, the base 461 may lack holes or cavities such as to exclude any internal power cables and communication lines from passing between the dock 200 and underground. In this manner, the base 461 may be self-sufficient in satisfying its own power and communication requirements.

Figure 4D:
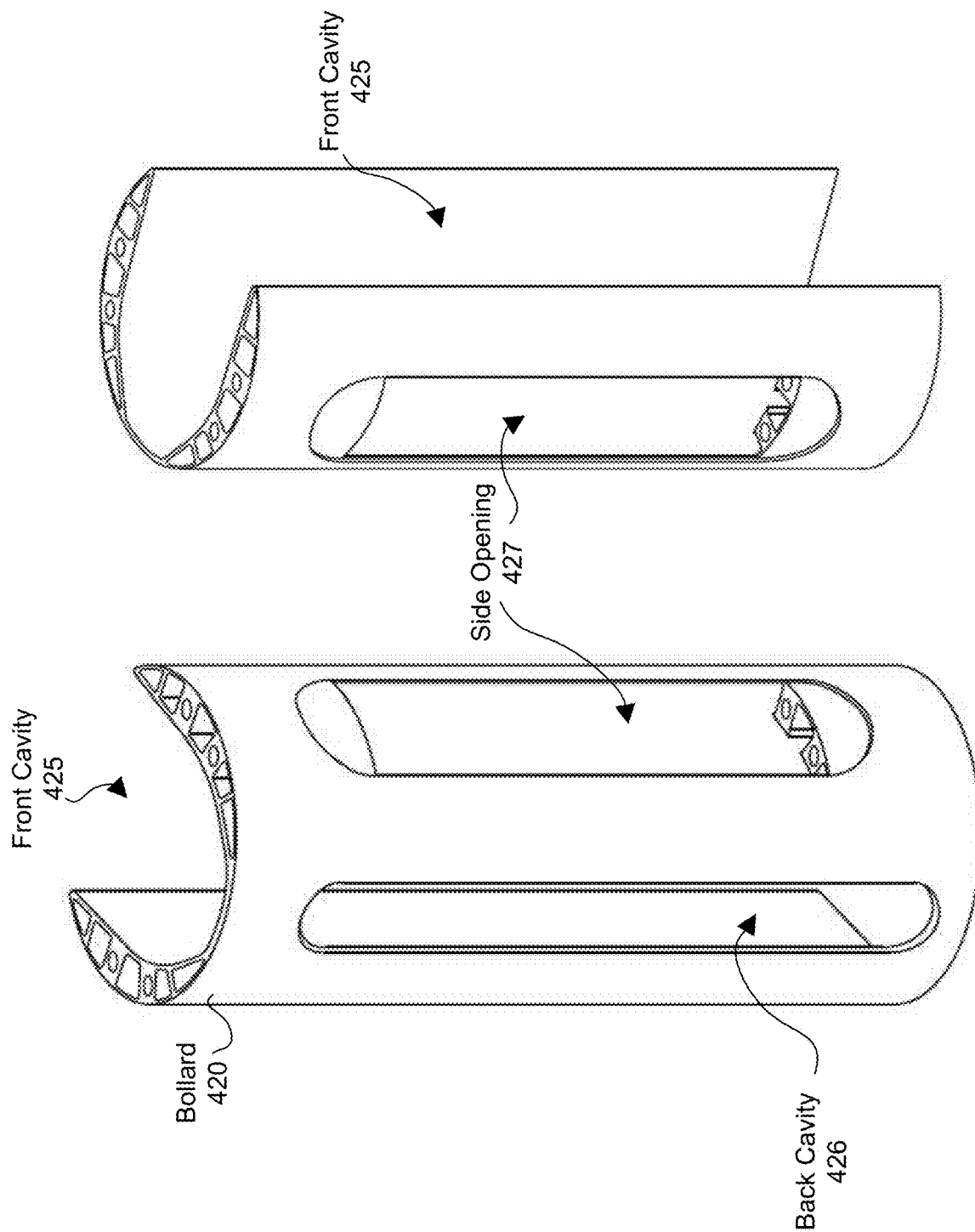

FIG. 4D illustrates an example bollard structure 420 with a linear aluminum profile. In particular embodiments, a bollard structure 420 may comprise a front cavity 425 and a back cavity 426 for receiving a rideable. For example, if a rideable is a bike, its front wheel would go through the front cavity 425 and may extend out through the back cavity 426. If a rideable is a scooter, a portion of the scooter may go into the front cavity 425 but may not necessarily extend out through the back cavity 426. In particular embodiments, a dock 200 may only comprise a front cavity 425 (without a back cavity 426). In particular embodiments, a bollard structure 420 may have a linear aluminum profile that is constructed using a single extrusion die. In particular embodiments, a solar panel may be fitted in the side opening 427 of a bollard structure 420.

Figure 4E:
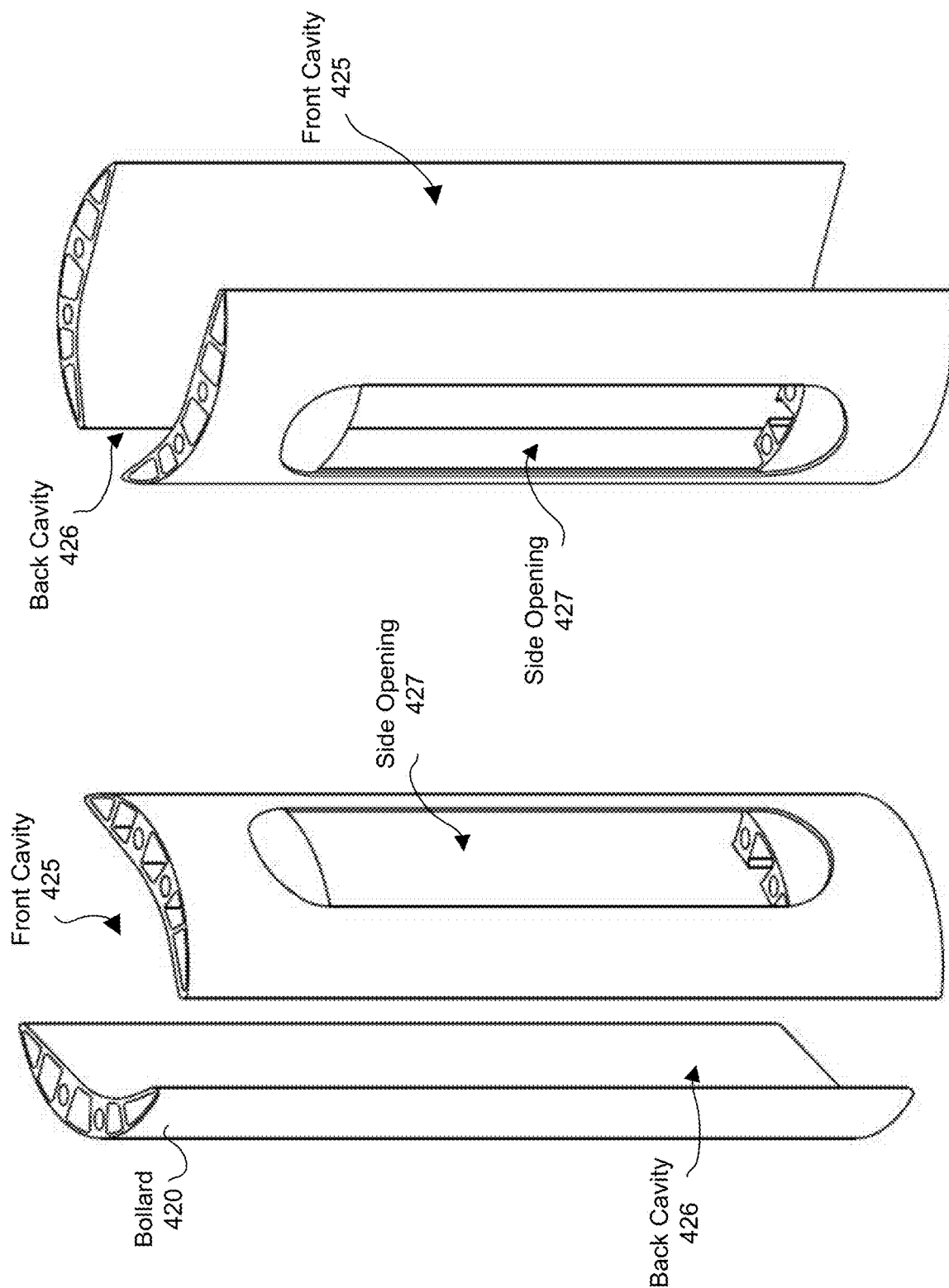

FIG. 4E illustrates an example bollard structure 420 with a separated aluminum profile. In particular embodiments, a bollard structure 420 may be comprised of two separate components, in contrast to the single aluminum profile shown in the embodiment of FIG. 4D. In some examples, the bollard structure 420 may be comprised of metal, composite, plastic, or a combination thereof.

Figure 4F:
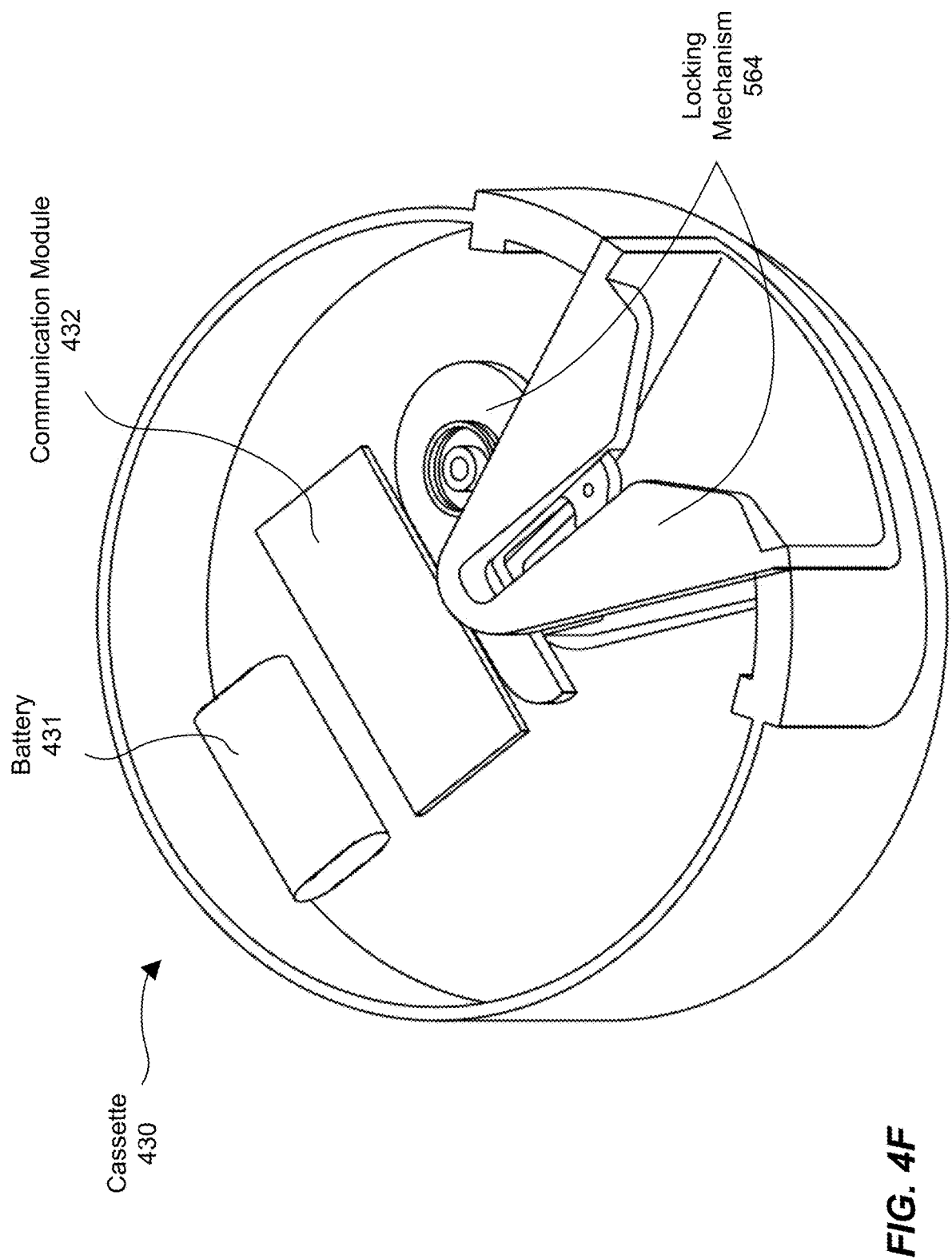

FIG. 4F illustrates an example cassette 430 of a dock 200. In particular embodiments, a cassette 430 carries a battery 431 for storing the energy harvested from solar panels, a communication module 432 for communicating wirelessly with external devices or systems (e.g., bike transportation management system), a locking mechanism 564, and a sensor for detecting the docking status of a vehicle and/or the dock 200. The sensor (not illustrated in FIG. 4F) may be installed within, or next to, the locking mechanism 564. In particular embodiments, the battery 431 may be a lithium battery, a single or double AA battery, or a single or double 18650 cell battery. In particular embodiments, a vehicle may comprise a locking member that is configured to be received by a locking mechanism 564. When a locking member is received by a locking mechanism 564, a locking mechanism 564 may mechanically lock the vehicle associated with the locking member to the dock 200. This locking process may occur automatically and mechanically based solely on the act of a vehicle (e.g., the locking member) being pushed into the locking mechanism 564, that is, without requiring any power (e.g., electrical energy). In some examples, the locking process may utilize power (as sourced from indirect sunlight) to lock the vehicle to the dock 200 using the locking mechanism 564. The unlocking process may require utilizing power. In particular embodiments, the unlocking process may begin when a dock 200's communication module 432 receives instructions or authentication message from a client device or a server to unlock a vehicle that is docked and locked to a dock 200. The locking mechanism 564 may then utilize power stored in a battery 431 to unlock the vehicle from the dock 200. At this point, the vehicle may be unlocked but still be docked at the dock 200. In particular embodiments, a locking mechanism 564 may comprise a sensor that is configured to detect whether a vehicle is docked to a dock 200 and whether a rideable is locked or unlocked to the dock 200. For a particular dock 200, a sensor may be configured to detect any of the following statuses: (1) no vehicle is docked, (2) a vehicle is docked and locked, and (3) a vehicle is docked but unlocked. In one example, if no vehicle is docked at the respective dock 200 based on the sensor, the respective dock may be configured to indicate that it is unavailable for use. In another example, if a vehicle is docked at the respective dock 200 based on the sensor, then the respective dock may be configured to indicate that it is occupied.

FIG. 5 illustrates example electrical components of a dock 200. In particular embodiments, a dock 200 may comprise a solar panel 211 that is configured to convert light/irradiance into electrical energy, an energy harvester 520 that is configured to charge a battery 530 using the converted energy, and a load 560 (e.g., communication module 562, locking mechanism 564, and sensor 567). In particular embodiments, the communication module 562 may comprise a cellular modem that enables wireless communication with a cell tower. The communication module 562 may also comprise other communication modules (near-field communication, bluetooth), for example, to communicate with client devices. The communication module 562 may also be configured to communicate with a bike/scooter transportation management system to receive instructions and to facilitate communication of the respective status of one or more docks to the transportation management system. For example, the transportation management system may wirelessly send instructions to a communication module 562 of a particular dock for the purpose of preemptively reserving that dock for a particular rider during a predetermined time of the day such that the particular dock is unavailable for use by other riders during the predetermined time of the day.

Figure 6:
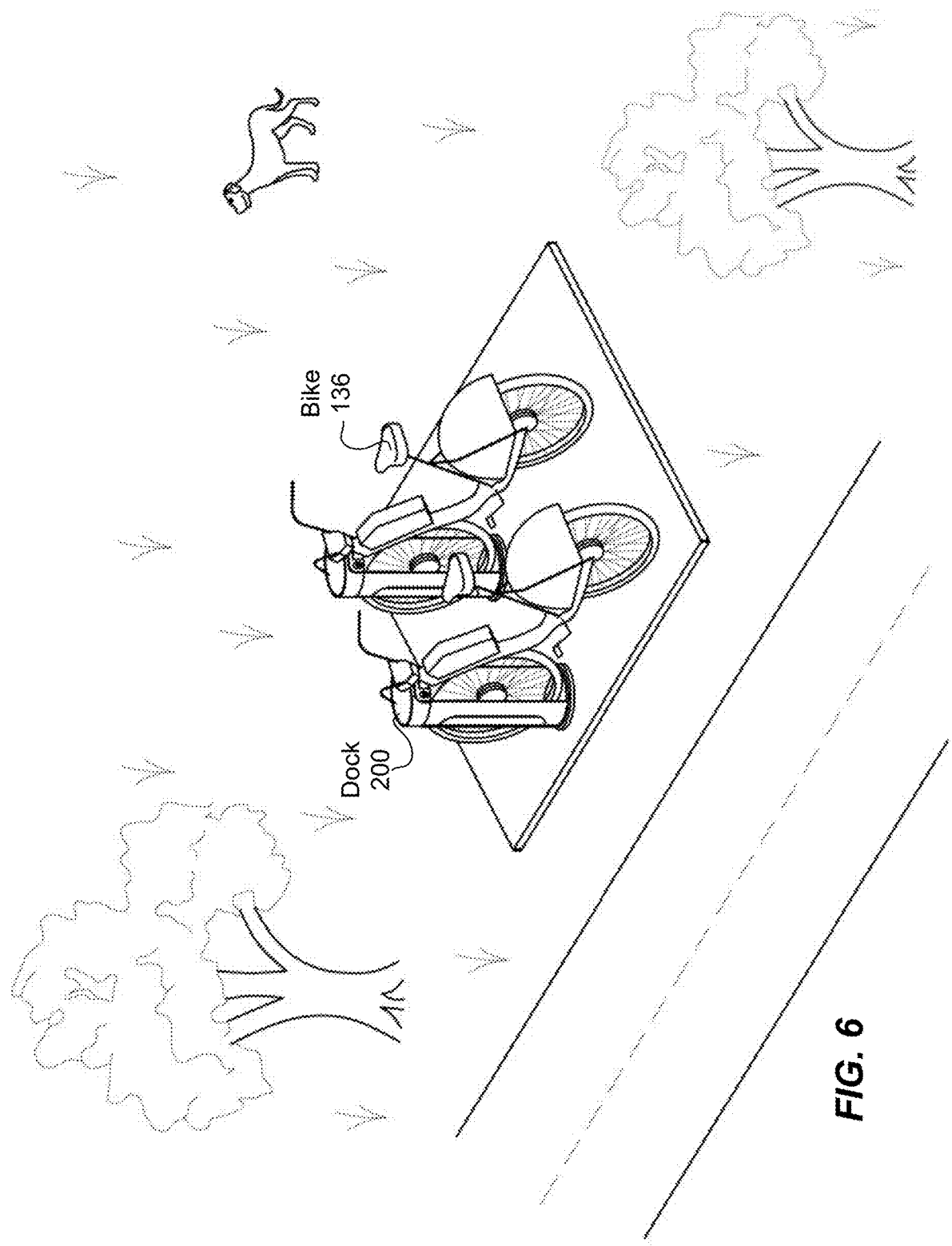
FIG. 6 illustrates an example docking station, according to some embodiments.

FIG. 6 illustrates an example docking station with two self-sufficient docks 200 that demonstrates the flexibility of how and where such self-sufficient docks 200 can be deployed. The self-sufficient docks 200 disclosed herein are able to independently generate its own power and independently communicate with external devices/systems, and thus are remarkably flexible on where and how they can be deployed. In contrast, traditional docking stations relying on a centralized power source are not so flexible because they require additional permitting and infrastructure (e.g., to connect to the power grid, installing a kiosk), which often translates to higher installation costs. Traditional docking stations also require a much bigger form factor, for example, because they require an external kiosk and/or electrical connections for connecting to the power grid. With the higher costs and bigger form factor, traditional docking stations are often difficult to install in high-density areas, such as a city downtown, where space is limited. The self-sufficient docks 200 disclosed herein provide a solution to those issues. Given that the solar panel, wireless communication module, and locking mechanism are all housed in each of the docks 200, each of these docks require a much smaller form factor and can be independently deployed in a much smaller area than the traditional docking stations. With respect to economic feasibility, there is no minimum number of self-sufficient docks 200 that are required for each docking station. Meaning, at any particular location, even a single self-sufficient dock may be installed, or alternatively as many as needed (e.g., 10, 25, 50 or more). The flexibility in deployment allows the self-sufficient docks 200 to be installed in a high-density area, such as a curb of a busy downtown intersection, or otherwise an area with limited space. FIG. 6 illustrates an example of how self-sufficient docks 200 can be flexibly deployed, where just two self-sufficient docks 200 are installed between the limited space between two trees. Additionally, the self-sufficient docks 200 may also be installed in areas where the electrical grid is not available since each dock 200 can independently generate its own power to operate its docking functionalities.

Figure 7:
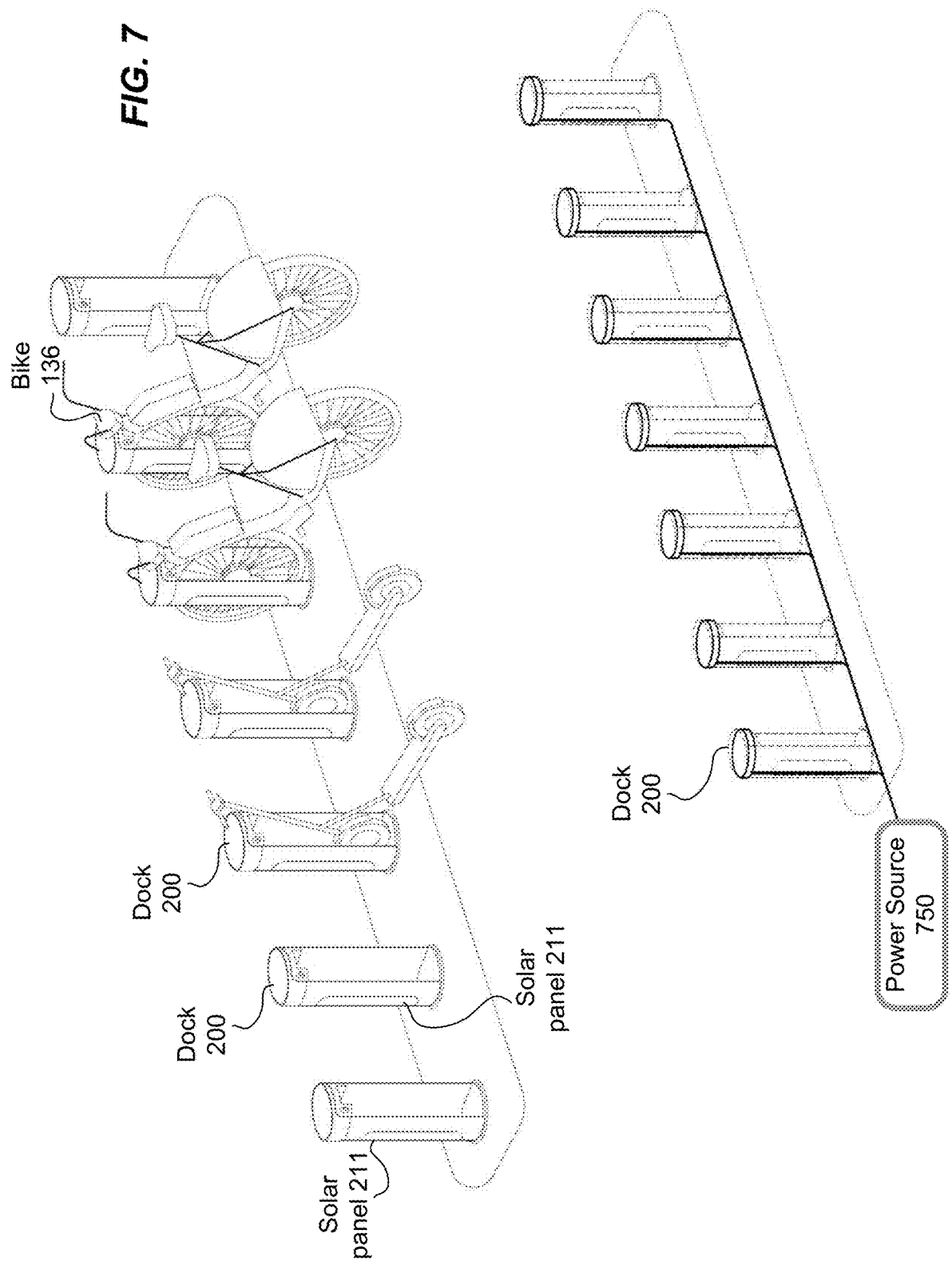
FIG. 7 illustrates an example docking station connected to an external power source, according to some embodiments.

FIG. 7 illustrates an example diagram of a docking station that is connected to an external power source 750, such as an electrical grid. In particular embodiments, the dock station may include a solar panel 211 for providing sufficient power to independently operate the docking functionalities of each respective dock station, as described herein. In particular embodiments, a docking station that is connected to an electrical grid may comprise some docks that are connected to the grid and some docks that are not. For example, a docking station may comprise two docks that are connected to an electrical grid and ten other docks that are not connected to the grid. In such embodiments, docks that are connected to an electrical grid may be configured to route the power from the grid to an electric rideable 136 docked onto the docks, for example, to recharge a battery coupled to the electric rideable 136.

Figure 8:
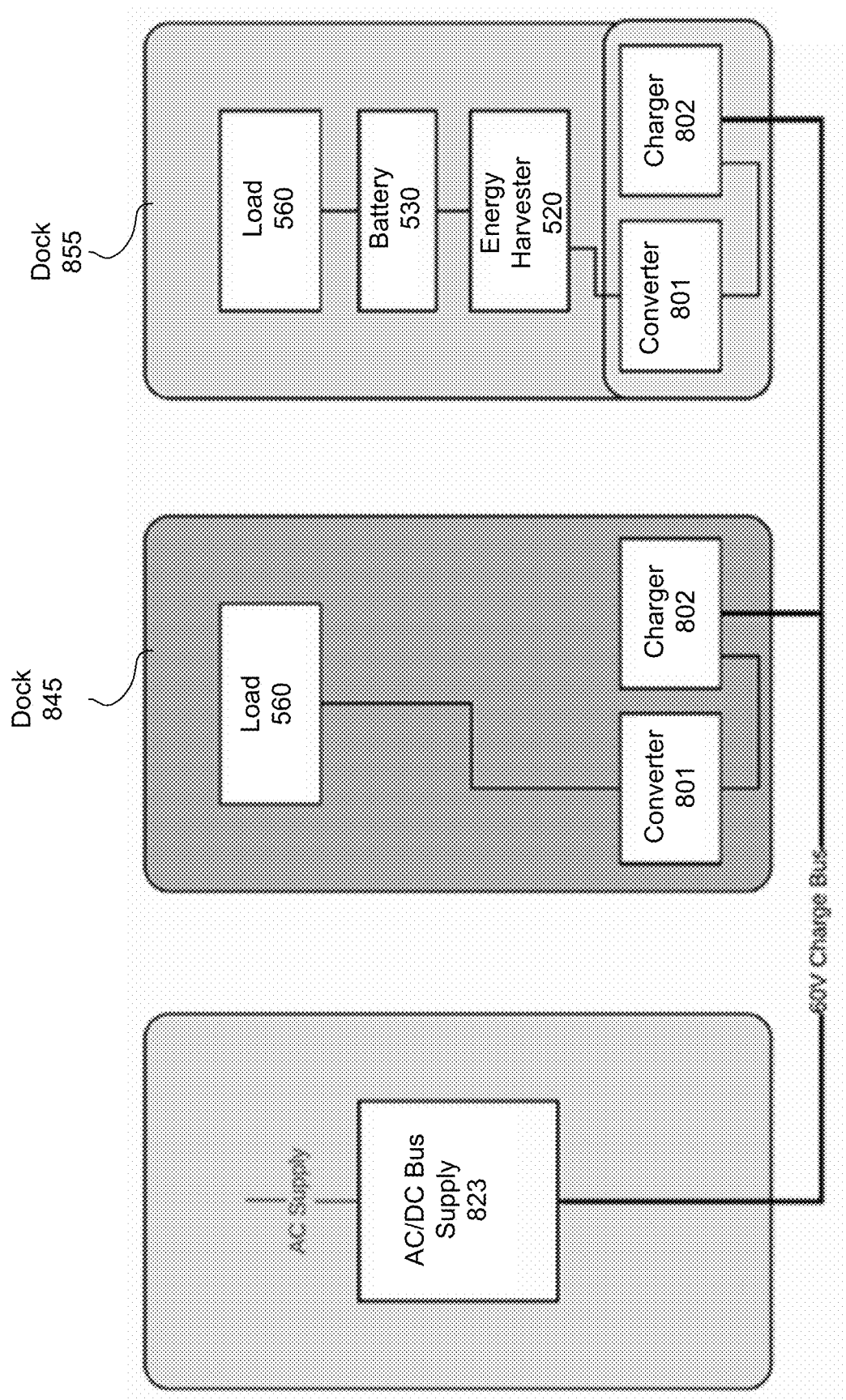
FIG. 8 illustrates an example of electrical components of a docking station connected to an external power source, according to some embodiments.

FIG. 8 illustrates example electrical components of a docking station that is connected to an external power source, such as an electrical grid. In particular embodiments, a docking station may comprise an AC/DC bus supply 823 that interfaces between the AC electrical grid and a DC bus of the docking station. In particular embodiments, self-sufficient docks 200 disclosed herein may be configured to rely on an external power source to operate its electrically-powered components rather than relying on a solar panel. For example, FIG. 8 illustrates an example dock 855 that has been configured substantially similar to a self-sufficient dock 200 described above but without a solar panel, and instead, configured with a charger 802 for charging an electric rideable, a converter 801 for providing power to an energy harvester 520, and a battery 530 for storing energy received from the energy harvester 520. FIG. 8 illustrates another example dock 845 that is substantially similar to dock 855 but without a solar panel, energy harvester, and battery, and instead, the dock 845 is configured to allow the converter 801 to directly provide power to the load 560. In some embodiments, self-sufficient docks 200 disclosed herein may be configured with solar panels and connected to an external power source. In such embodiments, the solar panels may be configured to work in parallel with the external power source, or as a back-up power source to the external power source. In other embodiments, the solar panels may be configured to supply power to a dock's internal electrically-powered components while using the external power source to charge electric rideable. In such embodiments, a dock may comprise a charger 802 but not a converter 801. In some embodiments, the dock may also utilize another energy harvesting mechanism besides a solar panel for capturing solar energy. For example, the dock may capture a renewable energy source (e.g., wind energy, hydroelectric, etc.) using an energy harvesting mechanism carried by the housing structure of the dock to independently generate sufficient energy to power the various docking functionalities.

Figure 9:
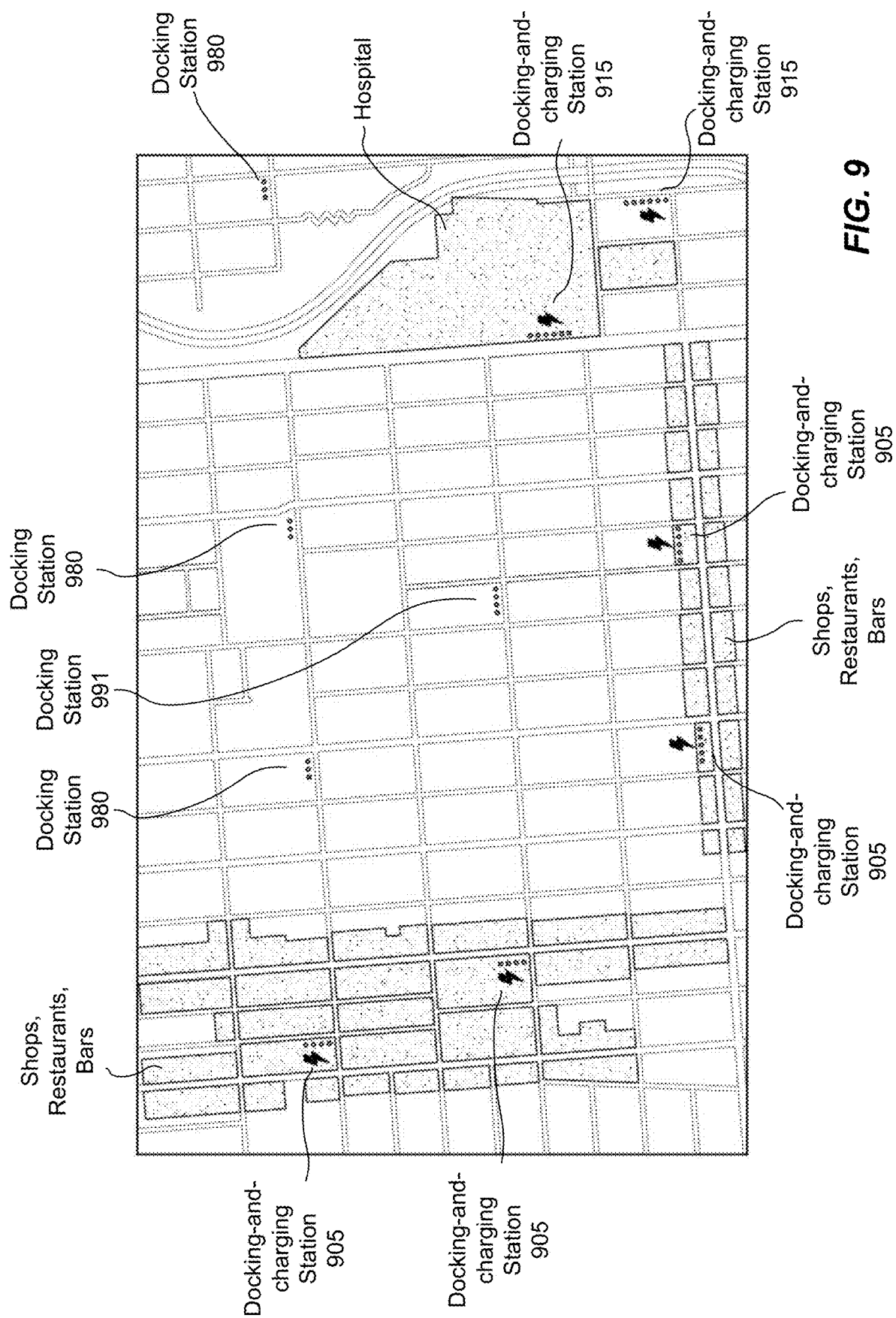
FIG. 9 illustrates a map of example docking stations installed in a region, according to some embodiments.

FIG. 9 illustrates a diagram that shows various docking stations installed at different locations in a region. In particular embodiments, docking stations with charging capability 905 (for charging electric rideables) may be installed at certain locations in a region and docking stations without charging capability 980 may be installed at other locations in the region. For example, docking stations with charging capability 905 may be installed at locations with access to an electrical grid. Docking stations without charging capability 980 may be installed at locations without access to an electrical grid but may also be installed at locations with access to the grid. In particular embodiments, docking stations with charging capability 905 may comprise some docks that are connected to an external power source and other docks that are not connected to the external power source. For example, in a low-density area with low foot-traffic, a docking station with charging capability 905 may comprise a single dock that is connected to the electrical grid and three other docks that are not connected to the electrical grid. As another example, in high-density areas with high foot-traffic, a docking station with charging capability 905 may comprise five docks that are connected to the electrical grid and twenty-five other docks that are not connected to the electrical grid. In particular embodiments, only the docks 200 that are connected to an electrical grid may be configured with a charger for charging an electric rideable. In particular embodiments, foot traffic patterns at various locations may be determined based on GPS location tracking of user devices or based on a measurement of a number of rideables that are rented from, or docked to, particular docking stations over a particular period of time. In particular embodiments, different number of docks may be installed in various locations based on user demand, which may be determined based on (1) historical data indicating how often rideables are rented from a particular docking station, (2) based on foot traffic patterns, or (3) based on location tracking. For example, each of docking stations 980 shows that it comprises three docks (e.g., represented by three dots) and docking station 991 shows that it comprises four docks. As another example, given that a hospital is a location commonly visited by users, FIG. 9 illustrates that docking-and-charging stations 915 that are installed by the hospital comprise more docks than the docking-and-charging stations 905 that are scattered around shops, restaurants, and bars.

As illustrated in FIG. 9, the geographic region includes a combination of both docking-and-charging station 905 and non-charging stations (e.g., docking station 980 and docking station 991). Indeed, it may be costly to implement docking-and-charging station 905 at every location in the geographic region that is eligible for a docking station due to the high cost in building and maintaining the charging infrastructure needed to connect each of the docking-and-charging station 905 to an electrical grid. As a result, there can be a point of diminishing returns if charging stations are implemented in every location in the geographic region that makes it infeasible to do so. FIG. 9 illustrates that the docking-and-charging station 905 is strategically positioned in regions that have a large amount of foot traffic (e.g., close to shops, restaurants, bars, hospital, etc.) and are also within travel distance to the non-charging stations (e.g., docking station 980 and docking station 991) such that an electrically-powered rideable undocked by a rider from the docking station 980 has ample charge to ride to any one of the docking-and-charging stations 905.

Although FIG. 9 illustrates that there are more docking-and-charging stations 905 than non-charging stations (e.g., docking station 980 and docking station 991), it should be noted that any amount of distribution between charging and non-charging docking stations may be utilized in the geographic region in order to meet the needs of the geographic area. For example, if the geographic area has a centrally located downtown city area with shops, restaurants, bars, entertainment venues that is surrounded by suburban areas, then the downtown city area may include the majority of the charging stations while the suburban areas may include the majority of the non-charging stations. In this manner, the high cost in building and maintaining the charging infrastructure needed to connect each of the charging stations to an electrical grid is balanced by high ridership in the downtown city area.

In particular embodiments, a dock 200 that is connected to an external power source (e.g., electrical grid) may not be configured with a solar panel, instead configured to rely on the external power source to operate its internal electrically-powered components. In other embodiments, a dock 200 may be configured with solar panel(s) to work in parallel with the electrical grid, or as a back-up power source to the electrical grid. In some embodiments, a dock 200 that is connected to an external power source may still be configured with a solar panel used to provide the necessary power for its electrically-powered components, while using power from the external power source to charge an electric rideable connected to the dock 200.

In particular embodiments, each of the docking stations in a region, such as those illustrated in FIG. 9, may communicate with each other and/or a server via a cloud. For example, each self-sufficient dock 200 may comprise a communication module that allows it to communicate to a server.

In particular embodiments, when a user requests a rideable from a docking station, a server may select a particular rideable docked at a station based on the user's origination location, destination location (e.g., specified by a user), estimated duration of the trip, user's preference of a rideable (e.g., electrically-powered rideable or not electrically-powered rideable), and/or the amount of charge left on the electrically-powered rideables. For example, if a user requests an electrically-powered rideable, a server may analyze the amount of charge left on each of the docked rideables and select one that is sufficiently charged. If a user requests an electrically-powered rideable at a docking station without charging capability and the docking station at the destination location is capable of charging, a server may select an electrically-powered rideable that has low charge but is still capable of reaching the destination location so the rideable can be charged when the user finishes the ride. In some embodiments, when a user requests a rideable from a docking station, a server may provide a user with all of the rideables that are available at the docking station to allow the user to select any particular rideable that is available and reserve that rideable for the user. The reserved rideable may then be held unavailable for a maximum time period (e.g., 5-30 minutes) before being made available to other users.

Figure 10:
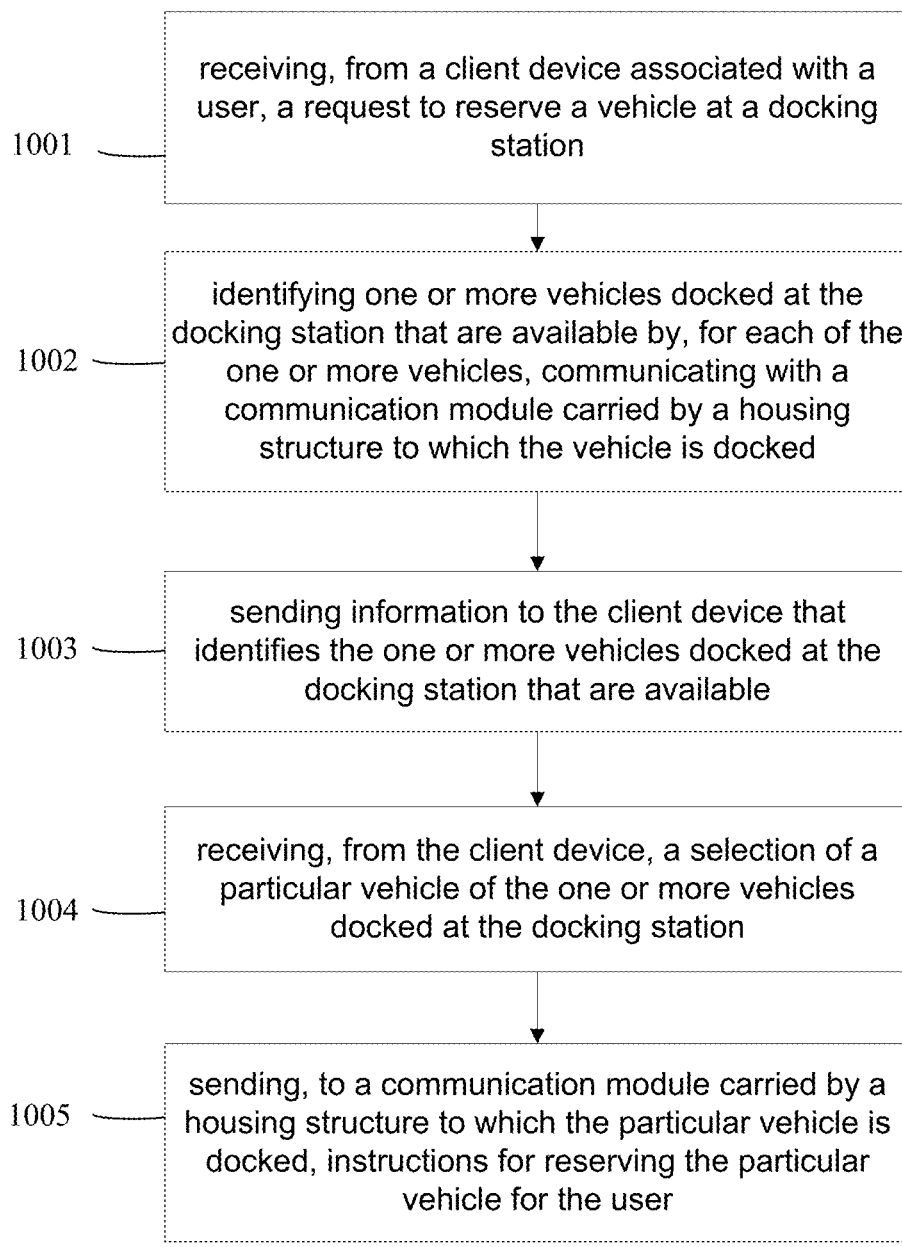
FIG. 10 illustrates an example method for communicating with individual docks at a docking station, according to some embodiments.

FIG. 10 illustrates an example method 1000 for communicating with individual docks at a docking station to allow a user to reserve a particular vehicle that is docked at a particular dock. In some embodiments, the method 1000 may be executed by a transportation management system that is in communication with various docking stations and users. The method may begin at step 1001 by receiving, from a client device associated with a user, a request to reserve a vehicle at a docking station. At step 1002, the method may continue by identifying one or more vehicles docked at the docking station that are available by, for each of the one or more vehicles, communicating with a communication module carried by a housing structure to which the vehicle is docked. At step 1003, the method may continue by sending information to the client device that identifies the one or more vehicles docked at the docking station that are available. At step 1004, the method may continue by receiving, from the client device, a selection of a particular vehicle of the one or more vehicles docked at the docking station. At step 1005, the method may continue by sending, to a communication module carried by a housing structure to which the particular vehicle is docked, instructions for reserving the particular vehicle for the user. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for communicating with individual docks at a docking station to allow a user to reserve a particular vehicle that is docked at a particular dock, this disclosure contemplates any suitable method for communicating with individual docks at a docking station to allow a user to reserve a particular vehicle that is docked at a particular dock, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
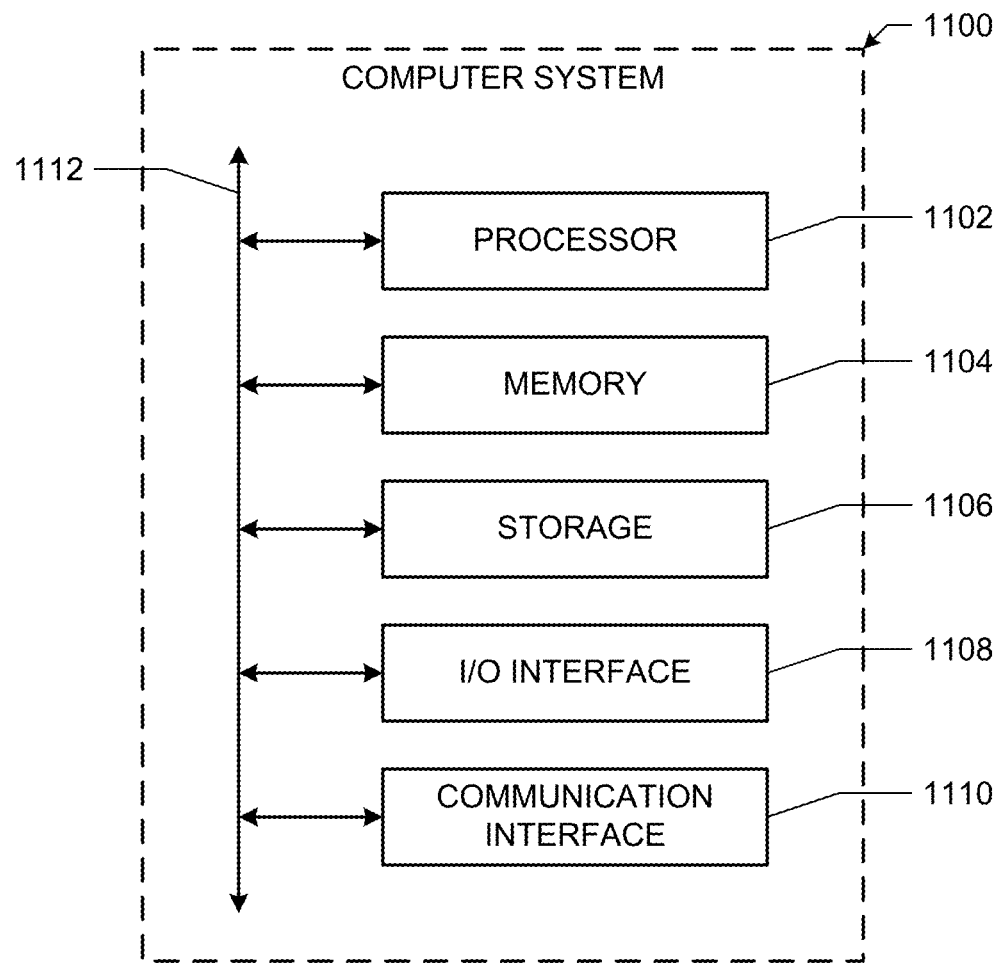
FIG. 11 illustrates an example computer system, according to some embodiments.

FIG. 11 illustrates an example computer system 1100. In particular embodiments, one or more computer systems 1100 perform one or more steps of one or more methods described or illustrated herein. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A dock for docking a rideable vehicle, comprising:
a housing structure comprising two side portions and a top portion connecting the two side portions, the two side portions and the top portion defining a cavity for receiving a portion of the rideable vehicle;
an electrically-powered locking assembly, coupled to the housing structure, for securing the housing structure to the rideable vehicle subsequent to the portion of the rideable vehicle being received by the cavity of the housing structure, wherein the portion of the rideable vehicle being received by the cavity of the housing structure is a locking member of the rideable vehicle;
an electrically-powered wireless communication device, located within the housing structure, for enabling data communication over a network to indicate a status of the rideable vehicle relative to the housing structure;
a solar panel, coupled to an external surface of one of the side portions of the housing structure, for independently converting light received by the solar panel into electrical energy; and
a battery that is configured to store the electrical energy converted by the solar panel, wherein the battery is located within the housing structure and is configured to independently power (i) the electrically-powered locking assembly to unlock the rideable vehicle from the housing structure, and (ii) the electrically-powered wireless communication device to indicate the status of the rideable vehicle.

2. The dock of claim 1, further comprising an additional solar panel, the additional solar panel opposing the solar panel and coupled to an external surface of another side portion of the side portions of the housing structure, for converting light received by the solar panel into electrical energy to power (i) the electrically-powered locking assembly to unlock the rideable vehicle from the housing structure, and (ii) the electrically-powered wireless communication device to indicate the status of the rideable vehicle.

3. The dock of claim 1, wherein the rideable vehicle is a bicycle or a scooter, and the portion of the rideable vehicle being received by the cavity of the housing structure is a locking member of the rideable vehicle.

4. The dock of claim 1, wherein a sensor is configured for detecting the status of the rideable vehicle relative to the housing structure, wherein the status of the rideable vehicle indicates whether the rideable vehicle is (i) docked to the housing structure and unlocked or (ii) docked to the housing structure and locked.

5. The dock of claim 1, further comprising a charging assembly, located within the housing structure, for charging the rideable vehicle secured to the housing structure.

6. The dock of claim 5, wherein the charging assembly draws power from an external power source to charge the rideable vehicle when the rideable vehicle is secured to the housing structure via the electrically-powered locking assembly.

7. The dock of claim 1, wherein the electrically-powered locking assembly is configured to secure the rideable vehicle in response to the portion of the rideable vehicle being received by the cavity of the housing structure by mechanically locking the rideable vehicle to the housing structure without utilizing electrical energy.

8. The dock of claim 1, wherein the electrically-powered locking assembly is configured to unlock the rideable vehicle from the housing structure by utilizing electrical energy converted by the solar panel.

9. The dock of claim 1, wherein the electrically-powered wireless communication device further enables the data communication over the network for receiving instructions from a server to unlock the rideable vehicle from the housing structure.

10. The dock of claim 1, wherein the solar panel that is coupled to the external surface of one of the side portions of the housing structure is oriented vertically relative to a base of the dock.

11. The dock of claim 1, further comprising a charging assembly that is configured to receive power from an electrical power grid, wherein the charging assembly is configured for charging the rideable vehicle secured to the housing structure.

12. The dock of claim 1, wherein the dock is secured to a platform, wherein a second dock for docking a second rideable vehicle is secured to the platform, wherein the second dock comprises:
a second housing structure comprising two side portions and a top portion connecting the two side portions, the two side portions and the top portion defining a cavity for receiving a portion of the second rideable vehicle;
a second electrically-powered locking assembly, coupled to the second housing structure, for securing the second housing structure to the second rideable vehicle subsequent to the portion of the second rideable vehicle being received by the cavity of the second housing structure, wherein the portion of the second rideable vehicle being received by the cavity of the second housing structure is a locking member of the second rideable vehicle;
a second electrically-powered wireless communication device, located within the second housing structure, for enabling data communication over the network to indicate a status of the second rideable vehicle relative to the second housing structure;
a second solar panel, coupled to an external surface of one of the side portions of the second housing structure, for independently converting light received by the second solar panel into electrical energy; and
a second battery that is configured to store the electrical energy converted by the second solar panel, wherein the second battery is located within the second housing structure and is configured to independently power (i) the second electrically-powered locking assembly to unlock the second rideable vehicle from the second housing structure, and (ii) the second electrically-powered wireless communication device to indicate the status of the second rideable vehicle.

13. A dock for docking a rideable vehicle, comprising:
a base;
a housing structure mounted on the base and comprising two side portions and a top portion defining a cavity for receiving a portion of a rideable vehicle;
an electrically-powered locking assembly, coupled to the housing structure, for securing the housing structure to the rideable vehicle, wherein the portion of the rideable vehicle being received by the cavity of the housing structure is a locking member of the rideable vehicle;
a solar panel, coupled to an external surface of one of the side portions of the housing structure, for converting light received by the solar panel into electrical energy; and
an energy harvester, coupled to the solar panel, for storing the converted electrical energy into a battery located within the housing structure that is coupled to the energy harvester, wherein the electrical energy stored in the battery is used to independently power the electrically-powered locking assembly.

14. The dock of claim 13, further comprising an additional solar panel, coupled to an external surface of the housing structure, for converting light into electricity to power the electrically-powered locking assembly and an electrically-powered wireless communication device.

15. The dock of claim 13, wherein the electrically-powered locking assembly is configured to secure the rideable vehicle in response to the portion of the rideable vehicle being received by the cavity of the housing structure by mechanically locking the rideable vehicle to the housing structure without utilizing electrical energy.

16. The dock of claim 13, wherein the electrically-powered locking assembly is configured to unlock the rideable vehicle from the housing structure by utilizing electrical energy converted by the solar panel.

17. The dock of claim 13, further comprising a charging assembly, coupled to the housing structure, for charging a rideable vehicle secured to the housing structure.

18. The dock of claim 17, wherein the charging assembly draws power from an external power source to charge the rideable vehicle secured to the housing structure.

19. The dock of claim 13, wherein the solar panel that is coupled to a cylindrical body of the housing structure is oriented vertically relative to the base.

20. A system for docking and charging rideable vehicles, the system including vehicle-docking stations located in different geographic regions and in communication with a transportation management system, wherein the vehicle-docking stations comprise:
- a docking station located in a first geographic region, the docking station includes a first dock including:
  - a first housing structure having walls that define a cavity for receiving a portion of a first rideable vehicle;
  - a first solar panel, coupled to an external surface of one of the walls of the first housing structure, for converting light absorbed by the first solar panel into electrical energy;
  - a first battery that is configured to store the electrical energy converted by the first solar panel, wherein the first battery is located within the first housing structure and is configured to power the first housing structure for locking the first rideable vehicle to the first housing structure; and
  - a first electrically-powered wireless communication device, located within the first housing structure, in communication with the transportation management system, for indicating a status of the first dock in association with the first rideable vehicle; and
- a charging station located in a second geographic region, the charging station includes a second dock including:
  - a second housing structure having walls that define a cavity for receiving a portion of a second rideable vehicle;
  - a second solar panel, coupled to an external surface of one of the side portions of the second housing structure, for converting light absorbed by the second solar panel into electrical energy;
  - a second battery that is configured to store the electrical energy converted by the second solar panel, wherein the second battery is located within the second housing structure and is configured to power the second housing structure;
  - a charging assembly, located within the second housing structure, for charging the second rideable vehicle, wherein the second geographic region includes an electrical source and the charging assembly receives power from the electrical source for charging the second rideable vehicle; and
  - a second electrically-powered wireless communication device, located within the second housing structure, in communication with the transportation management system, wherein the second electrically-powered wireless communication device indicates a status of the second dock in association with the second rideable vehicle.

21. The system of claim 20, wherein the light that the first solar panel is configured to convert into electrical energy is reflected irradiance that has been reflected off of one or more objects in an external environment.

22. The system of claim 20, wherein the first dock and the second dock further include a sensor for detecting the status of the first and second rideable vehicles, wherein the status indicates whether the first and second rideable vehicle are unlocked or locked.

* * * * *